United States Patent [19]

Erickson

[11] Patent Number: 4,591,024

[45] Date of Patent: May 27, 1986

[54] LUBE OIL RING PUMP

[75] Inventor: John W. Erickson, Huntington Beach, Calif.

[73] Assignee: Dresser Industries, Inc., Dallas, Tex.

[21] Appl. No.: 591,210

[22] Filed: Mar. 19, 1984

[51] Int. Cl.$^4$ ............................................. F01M 9/06
[52] U.S. Cl. ................................................... 184/11.2
[58] Field of Search .................. 184/11.1, 11.2, 11.3, 184/11.4, 11.5, 13.1, 15.3, 63; 384/405, 406

[56] References Cited

U.S. PATENT DOCUMENTS

| 787,654 | 4/1905 | Allmond | 184/63 |
|---|---|---|---|
| 831,506 | 9/1906 | Geisenhoner | 384/406 |
| 905,631 | 12/1908 | Bascome et al. | 384/406 |
| 1,017,132 | 2/1913 | Burke | 384/406 X |
| 1,065,865 | 6/1913 | Eisenmann | 384/406 |
| 1,111,941 | 9/1914 | Bardin et al. | |
| 1,466,731 | 9/1923 | Schmidt | 384/405 |
| 1,564,832 | 12/1925 | Dana | 384/406 |
| 1,715,010 | 5/1929 | Schmidt | |
| 2,045,026 | 6/1936 | Rosendahl | 384/404 |
| 2,285,754 | 6/1942 | Money | 184/11.1 X |
| 3,065,822 | 11/1962 | McAfee et al. | 184/11.1 X |
| 3,635,311 | 1/1972 | Kaufman | 184/11.2 |

FOREIGN PATENT DOCUMENTS

| 510102 | 2/1955 | Canada | 184/13.1 |
|---|---|---|---|
| 2542947 | 9/1978 | Fed. Rep. of Germany . | |
| 3113151 | 3/1982 | Fed. Rep. of Germany . | |

Primary Examiner—Leonard E. Smith
Attorney, Agent, or Firm—Fred A. Winans

[57] ABSTRACT

A lubrication system for moveable machine parts within a housing have a sump containing a fluid and a rotatable shaft comprising a ring eccentrically encircling and being frictionally rotated by shaft, ring being at least partially immersed in sump fluid to carry fluid during rotation for machine parts, a plurality of fluid carrying fins attached to ring to increase the fluid carrying capacity of ring, fins commencing from each outer edge and extending partially inwardly along the ring width towards each other thereby forming an annular space between fins and ring, conduit means having an inlet located within annular space for receiving fluid carried in annular space and delivering fluid to moveable machine parts, and first and second abutments attach to shaft, one on each side of ring and spaced from ring sufficiently to form an axial gap for a fluid film which transmits rotational power from abutments to ring.

43 Claims, 11 Drawing Figures

U.S. Patent May 27, 1986 Sheet 1 of 3 4,591,024
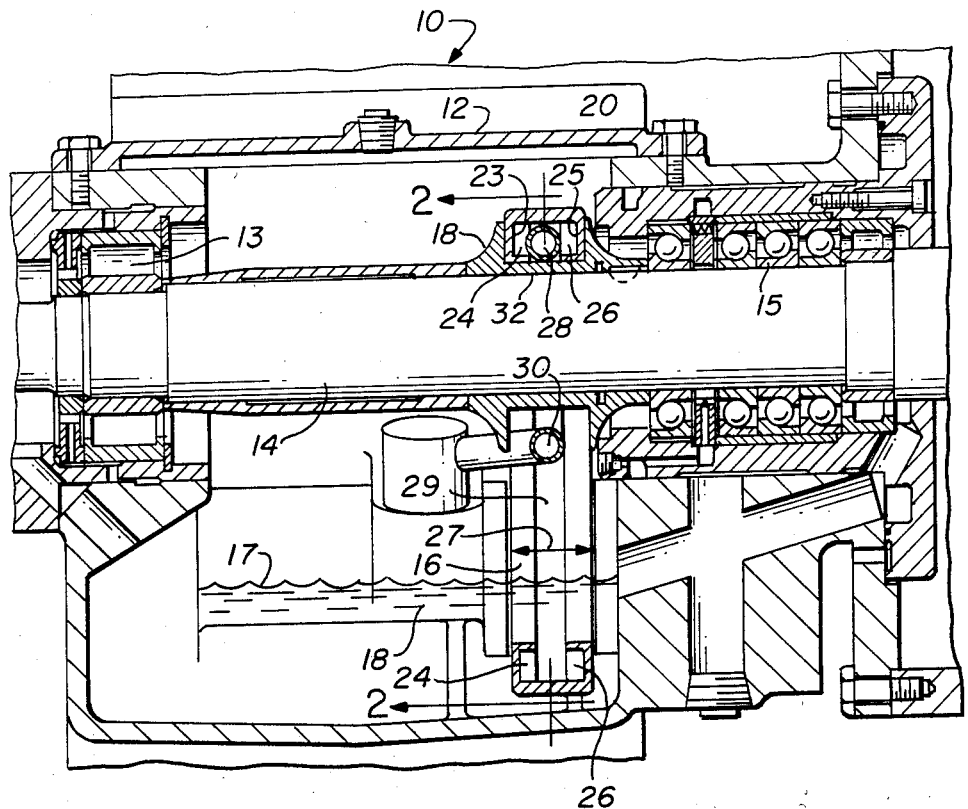
FIG. 1
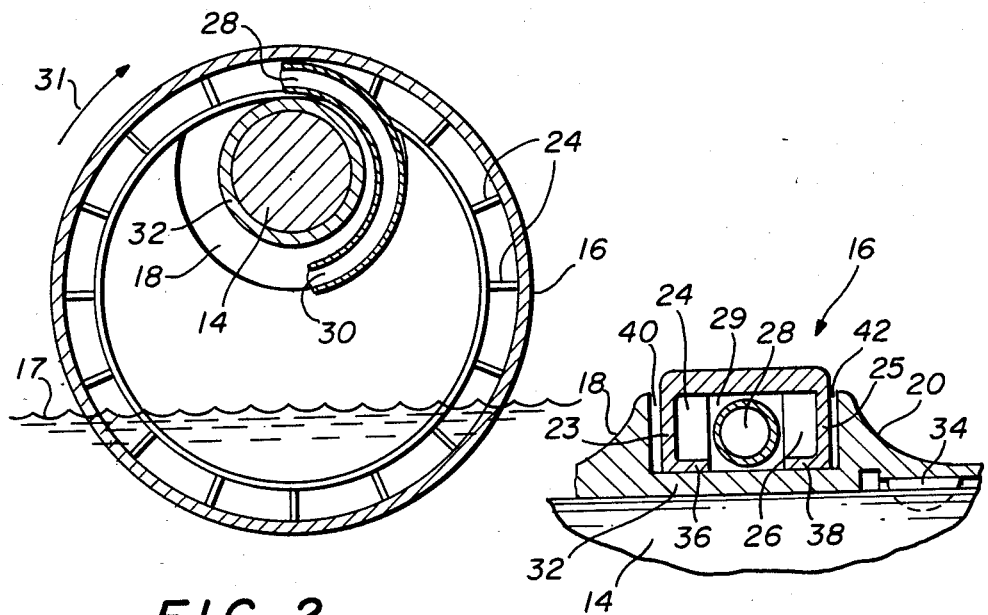
FIG. 2
FIG. 3

LUBE OIL RING PUMP

BACKGROUND OF THE INVENTION

The present invention relates to lubricating means or cooling means for moveable machine parts within a housing having a sump containing a fluid and a rotatable shaft and in particular to lubricating means for supplying bearings and other relatively moveable machine parts of a power unit with lubricant or coolant under pressure.

It is well known in the art that lubrication of transmission gears and bearing members in power transmission units is partially provided for by having certain of the gears rotated within the lubricant contained in the lubricant sump located in the bottom of the housing. While this system is helpful to supply lubricants to the various gears and bearings and moving machine parts, it is generally required to use, in addition, a positive-type pump to provide forced lubrication to various moveable machine parts within the housing in conjunction with the conventional splash feed system. The positive-type pumps are expensive, require considerable power to operate and require a considerable space in the housing unit where space is valuable, thus adding additional cost, requiring additional power and absorbing a space that could be used for other components.

Some prior art systems have attempted to overcome these problems by providing a pitot type tube pump for circulating lubricant through a power transmission under pressure by providing a lubricant receiving chamber on one of the power transmission gears and providing the chambers with lubricant whenever the gears rotate. When the gears rotate to a certain position, the intake nozzle of a pitot tube receives the lubricant from the chambers and forces it under pressure from the pitot tube to a distribution chamber which is in fluid communication with various passageways leading to the bearings and other moving parts of the transmission requiring lubrication. This system is found, for example, in U.S. Pat. No. 3,065,822. In this device, the power transmission gear having the lubricant receiving chamber is fixedly attached to the power shaft and is driven at whatever rate the shaft is turning. Thus, a direct driven gear is required which takes up space, is expensive and uses considerable power because it is directly driven from the power train. In addition, the speed of the gear, and thus the pressure, varies with a change in speed of the transmission.

In prior art U.S. Pat. No. 1,466,731, the ring is driven by the use of a well known shear area causing a frictional drag between the ring and the shaft. In this patent the oil ring is L-shaped with a very small, localized, shear area on the end of one leg of the L. This is a very low power drive and would not provide enough horsepower to activate any useful pump. Thus, a separate shaft driven impeller is required.

One important advantage of the axial shear drive is that the speed of the ring is proportional to the square root of the main shaft speed. This is an important advantage where the main shaft varies in speed. With the shear drive arrangement, the oil pumping system provides more nearly constant output than a system whose speed is directly varied with the main shaft speed.

Another major advantage of the use of an axial shear drive with the present invention is the ability to adjust the power transmitted to the ring by changing the axial gap between the ring and the drive sheave. This allows relatively large powers to be transmitted, in the 1 to 10 horsepower range.

Further, the present invention compensates for variation in horsepower transmitted to the oil ring from the drive sheave due to the change in viscosity of the lube oil due to temperature changes. This is accomplished by using metals with dissimilar coefficients of thermal expansion to change the axial gap between the ring and the drive sheave in response to temperature. It has been found that where a fixed gap exists with no compensation for thermal expansion of the ring and drive sheave, the power transmitted due to temperature change can vary through a 10 to 1 variation.

If the axial gap between the ring and the drive sheave is corrected for thermal expansion due to temperature by the use of dissimilar metals, a power variation of 3 to 1 is obtained. By using an additional correction as taught by the present invention, the power transmitted to the ring is relatively constant during a temperature range of 30° F. to 200° F.

SUMMARY OF THE PRESENT INVENTION

Thus, the present invention relates to a lubrication system or a coolant system or both for moveable machine parts within a housing having a sump containing a fluid and a rotatable shaft comprising a ring eccentrically encircling and being frictionally rotated by said shaft, said ring being a channel U-shaped in cross-section with the open end of the U facing said shaft and being at least partially immersed in the sump fluid to carry said fluid during rotation of said ring, conduit means having an inlet located within said U-shaped channel and adjacent said shaft for receiving fluid carried by said channel and delivering the fluid to said moveable machine parts, a plurality of fluid carrying fins attached to the inside of each leg of said U-shaped channel to increase the fluid carrying capacity of said ring, said fins extending partially inwardly toward the center of said U thereby forming an annular space between said fins and means for locating said conduit means inlet in said annular space for receiving fluid from said fins.

The invention further comprises a lubrication system for moveable machine parts within a housing having a sump containing a fluid and a rotatable shaft comprising a ring eccentrically encircling and being frictionally rotated by said shaft, said ring being at least partially immersed in said sump fluid to carry said fluid for said machine parts during rotation, and first and second abutments attached to said shaft, one on each side of said ring and spaced from said ring sufficiently to form an axial gap for a fluid film which transmits rotational power from said abutments to said ring.

BRIEF DESCRIPTION OF THE DRAWINGS

These and other more detailed objects and advantages of the present invention will be disclosed in conjunction with the accompanying drawings in which:

FIG. 1 is a diagrammatic representation of the novel lubricating system installed in a housing having moveable machine parts therein and a sump containing a fluid and a rotatable drive shaft;

FIG. 2 is a cross-section of the novel lubrication system taken along lines 2—2 of FIG. 1;

FIG. 3 is an expanded view of the upper portion of the novel lubrication system shown in FIG. 1 illustrating the adjustable gap between the ring assembly and the first and second abutments on either side thereof;

DETAILED DESCRIPTION OF THE DRAWINGS

Figure 5:
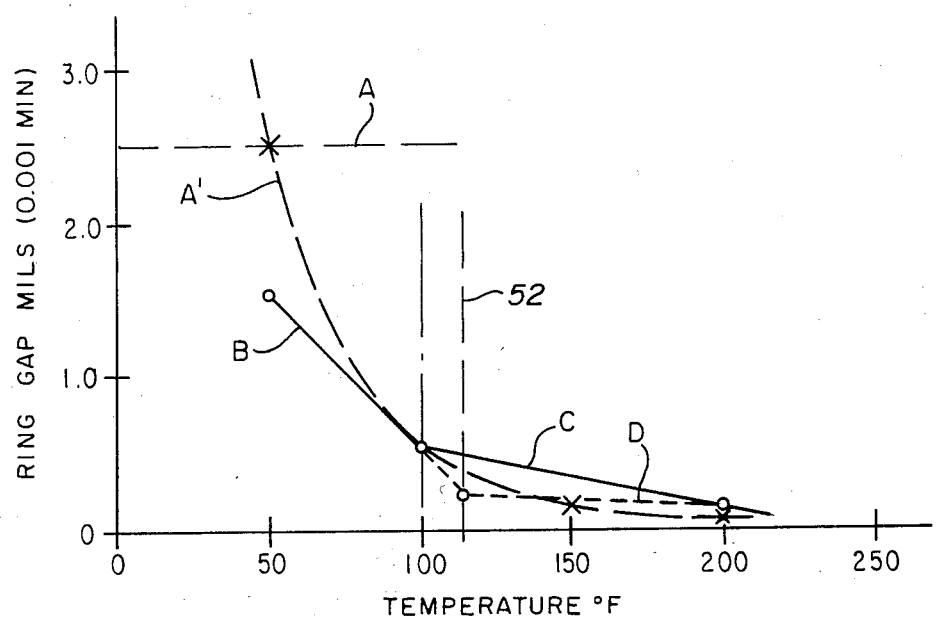
FIG. 5 is a graph illustrating the normal relationship of the gap between the ring and the associated drive abutments with change in temperature for a fixed gap and the gap of the present invention which is compensated for temperature to provide a relatively constant horsepower output.

FIG. 1 discloses a partial diagrammatic representation of a machine unit 10 including a housing 12 having therein a rotatable drive shaft 14 rotatably mounted in bearings 13 and 15. An oil ring 16 eccentrically encircles shaft 14 and is frictionally rotated by shaft 14 by means well known in the art as a localized shear area between ring 16 and shaft 14. Ring 16 is at least partially immersed in fluid 17 located in sump 18 which, of course, may be any type of lubricating or cooling fluid such as liquid oil and carries the fluid 17 during rotation for use by the moveable machine parts within housing 12. While the invention is described and claimed in relation to lubrication it should be understood that by "lubrication" or fluid lubricant it is intended that cooling or fluid coolant is intended to be included.

In the present invention, first and second abutments 18 and 20 are attached in a fixed manner to shaft 14, one on each side of ring 16 and spaced from ring 16 sufficiently to form the axial gaps 40 and 42 and to form a fluid film for the shear area in the gaps 40 and 42 shown in FIG. 3 which transmits the rotational power from the rotating abutments 18 and 20 to ring 16. Also the driving shear area exists between base 32 and projecting lips 36 and 38 on ring 16. A plurality of fluid carrying fins 24 and 26 are attached to ring 16 to increase the fluid carrying capacity of ring 16. Fins 24 and 26 are attached to ring 16 commencing from each outer leg 23 and 25 respectively and extend partially inwardly in a transverse direction along the ring width illustrated by arrow 27 towards each other thereby forming an annular space 29 between said fins 24 and 26.

Conduit means 30 having an inlet 28 located within the annular space 29 receives fluid carried in annular space 29 by ring 16 and fins 24 and 26 and delivers said fluid 17 through tube 30 to be delivered to the various moveable machine parts.

As can be seen in FIG. 2 which is a cross-sectional view taken along lines 2—2 in FIG. 1, oil carrying ring 16 is eccentrically mounted on and encircles shaft 14 and is frictionally rotated by shaft 14. Abutment 18 is fixedly attached to shaft 14 and rotates with it. Ring 16 rotates in the direction of arrow 31 and vanes or fins 24, which are at least partially immersed in fluid 17, carry fluid 17 with them. Conduit means 30 has inlet 28 located within the annular space 29 of ring 16 as shown in FIG. 1 and receives the fluid 17 carried in the annular space 29 by fins 24 and 26 and the fluid 17 is delivered through conduit 30 to a manifold 33 which couples the fluid to the moveable machine parts which require the lubrication.

As can be seen in the cross-section of FIG. 1 or FIG. 3, ring 16 is C-shaped in cross-section with vanes 24 and 26 therein to provide a deep annulus 29 of lubricating fluid which is carried to the input 28 of the pitot tube 30 for the pumping effect and delivery to the moveable machine parts.

Although the patent to Schmidt, U.S. Pat. No. 1,466,731 utilizes an L-shaped oil ring with vanes or fins and the oil ring is driven by a shear area between the ring and the drive shaft, no pitot tube is used to receive the fluid and, in fact, a shaft driven impeller must be used by Schmidt which is separately shaft driven and a pump is required to generate enough pressure to make the fluid usable that is carried by the L-shaped ring 9. Thus the present invention improves over the prior art in that although a shear drive is used to rotate the oil ring, the addition of vanes or fins to the U-shaped ring to provide a deep annulus of oil enables sufficient oil or lubricant to be carried to the pitot tube to produce a pumping effect which is sufficient to provide the lubrication needed. Thus, no driven gears or impeller type pumps are required with this invention.

FIG. 3 is an enlarged view of the upper portion of ring 16 and shaft 14 shown in FIG. 1. In FIG. 3, it will be noted that first and second abutments 18 and 20 are connected by a means which may be an integrally formed base 32. This entire unit encircles shaft 14 and is held in a rigid relationship thereto by a spline 34 which is keyed in a keyway in shaft 14 in a well known manner. Thus, first and second abutments 18 and 20 and connecting base 32 rotate with shaft 14 as an integral unit. As stated earlier, ring 16 is rotated by the friction in the shear area between base 32 and projecting lips 36 and 38 which project inwardly from legs 23 and 25 forming the U-shaped channel of ring 16. In addition, fluid in gaps 40 and 42 which exist between legs 23 and 25 of ring 16 and abutments 18 and 20 also cause a shear force which assists in rotating ring 16.

It is well known in the art that as the temperature of the lubricating fluid changes the viscosity changes and thus the friction caused by the shear force in gaps 40 and 42 changes and the rate of rotation of ring 16 also varies. As a matter of fact, as can be seen in curve A of FIG. 6, if the gap stays fixed, a 10 to 1 variation in the power transmitted to ring 16 occurs as the temperature changes for a fixed gap. A "fixed gap" is one occurring where both the ring 16 and the abutments 18 and 20 are made of the same material and is illustrated in curve A of FIG. 5 where a steel alloy is that material. Since both the ring 16 and abutments 18 and 20 are made of the same steel alloy they expand in like manner and the gaps stay "fixed" and the power transmitted decreases. Thus, there is a variation in the power transmitted between the rotating shaft 14 and the oil ring 16 for variation in viscosity of the lube oil due to temperature change because of gap width change. FIG. 5, curve A', illustrates theoretically how ring gap 40 and 42 should vary in width with a change in temperature of the fluid medium 17, such as oil, in order to produce a constant output power to the ring 16. That change varies from approximately 2½ mils at 50° F. to approximately 1/10th of a mil at 200° F. Thus the gaps 40 and 42 would reduce in size to approximately 1/25th of their size at 50° F.

However, as noted by curve B in FIG. 5 if dissimilar metals are used in the construction of the ring 16 and the abutments 18 and 20, dissimilar thermal expansion of the ring 16 and the abutments 18 and 20 will occur to change the dimension of axial gaps 40 and 42 in response to the temperature change. As illustrated by curve B in FIG. 6, a 3 to 1 variation in power transmitted due to temperature change can be achieved by using dissimilar metals. For instance, if the ring 16 is made of aluminum and the abutments 18 and 20 are made of certain steel, the change in gap dimension mentioned with change in viscosity will be such that curve B will be followed as shown in FIG. 5. Thus, for the embodiment shown in FIG. 3, if abutments 18 and 20 are made of a certain steel and ring 16 is made of aluminum, the gaps 40 and 42 will decrease according to curve B of FIG. 5 and the transmitted horsepower versus oil temperature will vary according to curve B in FIG. 6.

Figure 4:
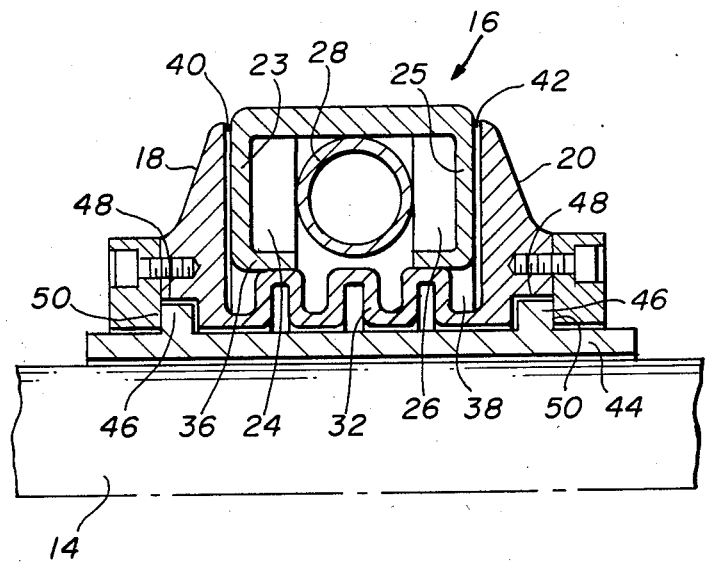
FIG. 4 is a cross-sectional view of a modified version of the upper portion of the novel lubrication system shown in FIG. 1 and FIG. 3 illustrating how the power transmitted from the abutments on either side of the ring can be adjusted by varying the gap in such a manner as to maintain a reasonably constant power delivered with changes in temperature.

This rate of gap closure, and thus the transmitted power, can be further controlled with the apparatus shown in cross-section in FIG. 4. In this arrangement, the means connecting the first and second abutments 18 and 20 is a bellows or corrugated panel arrangement 32. In addition, means such as a tube or cylinder 44 is interposed between the first and second abutments and corrugated panel 32 and shaft 14. Cylinder 44 is attached to shaft 14 for rotation in any well known means such as a slot and key, not shown. An arrangement is made for coupling the interposed cylinder 44 to the first and second abutments 18 and 20 by a tongue 46 and groove 48 formed in mating arrangement between first and second abutments 18 and 20 and the interposed cylinder 44. Thus as shaft 14 rotates, interposed cylinder 44 rotates with it and carries first and second abutments 18 and 20 along with it in rotatable fashion. In this arrangement, the first and second abutments 18 and 20 and corrugated panel 32 are formed of a first metal having a first coefficient of expansion such as INVAR, a nickle-iron alloy, while ring 16 is formed of a second metal having a second coefficient of expansion such as cast aluminum whereby the abutments 18 and 20 expand at a rate slower than ring 16 thereby generating a high rate of closure of gaps 40 and 42 between abutments 18 and 20 and ring 16 to increase the fluid drag as fluid viscosity increases with temperature.

Interposed cylinder or tube 44 forms a means for decreasing the rate of closure of gaps 40 and 42 as the temperature reaches a predetermined value. The interposed cylinder 44 is formed of a third metal which may be, for instance, a cast aluminum alloy which has a third coefficient of expansion which is greater than the expansion of abutments 18 and 20 but a slightly lower coefficient of expansion than ring 16. This is accomplished by positioning the tongues 46 of interposed cylinder 44 in groove 48 of abutments 18 and 20 such that a gap exists between tongue 46 and the side walls 50 of abutments 18 and 20. This allows the interposed cylinder 44 to axially expand freely until a predetermined temperature is reached at which time contact is made between the tongues 46 and side walls 50 of grooves 48 in abutments 18 and 20 and since interposed cylinder 44 is axially expanding at a faster rate than abutments 18 and 20 because of the dissimilar metals, force is applied to side walls 50 of grooves 48 of abutments 18 and 20 thus increasing the rate of expansion between abutments 18 and 20 because of the bellow like or corrugated panel 32 which flexes or deforms. Thus the rate of expansion between the first and second abutments 18 and 20 is increased thus decreasing the rate of gap closure for gaps 40 and 42 between first and second abutments 18 and 20 and ring 16. This occurs with increasing temperature above that predetermined temperature where contact is made between the tongues 46 and side walls 50 of groove 48. This is shown in FIG. 5 by curve C. Thus, as seen in FIG. 5 the rate of closure of gaps 40 and 42 is rapid between 50° and 100° as shown by curve B because the ring 16 is expanding at a greater rate than abutments 18 and 20. However, at such time as the tongues 46 of interposed cylinder 44 make contact with sides 50 of grooves 48 in abutments 18 and 20, cylinder 44 is expanding at a faster rate than abutments 18 and 20 because it is made of a dissimilar metal such as a cast aluminum alloy and it causes abutments 18 and 20 to expand faster through flexure of corrugated panel 32 thus decreasing the rate of closure of gaps 40 and 42 as shown by curve C in FIG. 5.

Figure 6:
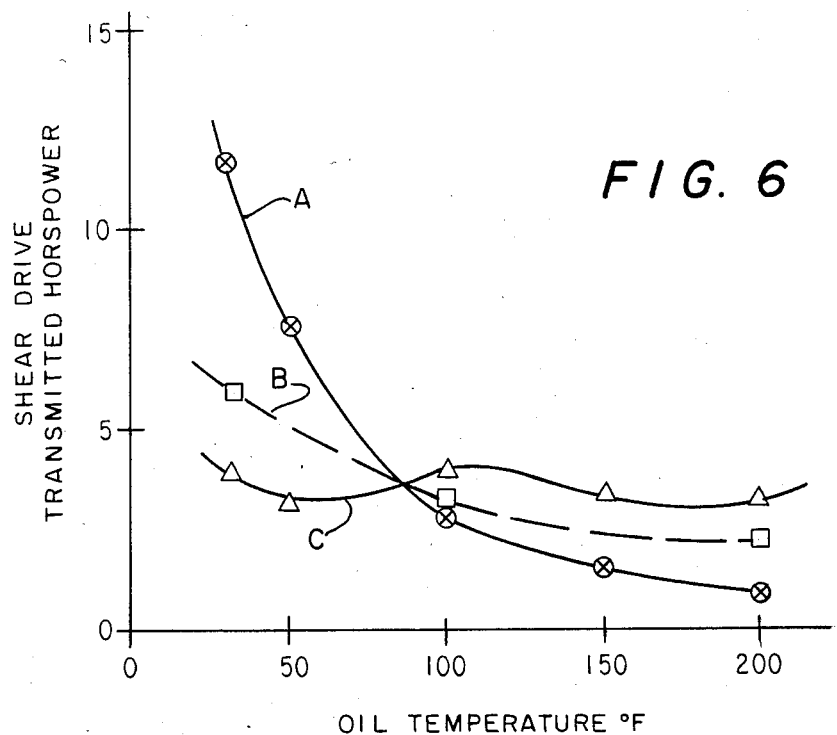
FIG. 6 is a graph illustrated varying amounts of power transmitted by the shear drive to the oil ring with increase of oil temperature and with control of gap width between the drive sheave and the oil ring.

It will be understood that if the original gap between tongues 46 of interposed cylinder 44 and side wall 50 of groove 48 of abutments 18 and 20 is large enough so that contact is not made until a higher temperature is reached such as represented by line 52 in FIG. 5 then a different curve would be obtained such as that shown by curve D in FIG. 5. By using three different metals or metal alloys in the construction of ring 16, means 32 connecting abutments 18 and 20 and interposed cylinder 44, with the three different metals or alloys having three different coefficients of expansion, obviously the curves shown in FIG. 5 can be varied. As shown in FIG. 6, curve C, with the use of metals or alloys of dissimilar thermal expansion to change the axial gap in response to temperature, a relatively constant power can be transmitted from the shaft 14 to ring 16 from 30° to 200° F.

Different types of rings 16 may be used with this invention depending upon the amount of lubricating fluid it is desired to transfer from sump 18 to moveable parts such as bearings. For instance in FIG. 7A, a ring which is rectangular in cross-section as shown may be used. This type of ring may be modified by adding fins 54 and 56 as shown in FIG. 7B to increase the amount of fluid being carried by the ring.

Figure 7:
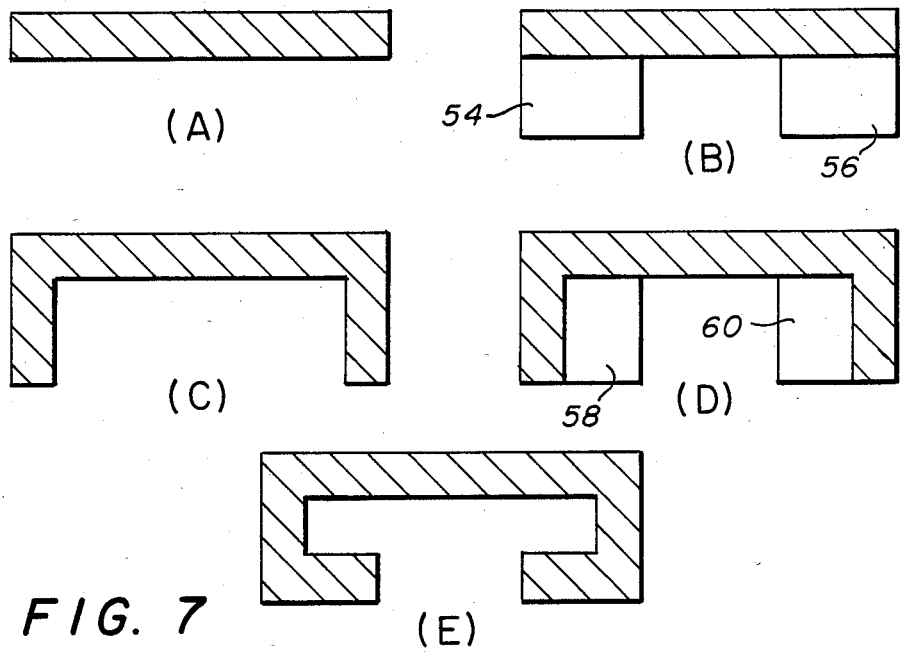
FIGS. 7A, B, C, D and E illustrate the cross-sectional views of various type rings that could be used with the present invention.

As shown in FIG. 7C, a U-shaped ring may be utilized or as shown in FIG. 7D a U-shaped ring having fins 58 and 60 may be utilized. Further, the C-shaped ring shown in cross-section in FIG. 7E may also be used and if it is desired to further increase the amount of lubricating fluid being carried by the ring, then the C-shaped ring with fins 24 and 26 as shown in FIG. 3 and FIG. 4 may be used.

It should be understood that while the abutments 18 and 20 have been described herein as integrally formed with a base 32, it is possible to achieve the desired results of controlling gap width by mounting individual abutments on a shaft 14 wherein the shaft 14 and ring 16 are formed of materials having the proper thermal coefficients of expansion.

Thus, a novel lubrication system has been disclosed which utilizes the axial shear pulley drive and with the addition of fins or vanes to a U-shaped ring provide a deep annulus of oil into which a pitot tube is dipped to produce a pumping effect. In addition, with the use of an axial shear drive with the ability to adjust the power transmitted to the ring by changing the axial gap between the ring and the drive sheave, a relatively constant amount of power is allowed to be transmitted over a wide temperature range.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined in the appended claims.

I claim:

1. A lubrication system for moveable machine parts within a housing having a sump containing a fluid and a rotatable shaft comprising:
   a. a ring eccentrically encircling and being frictionally rotated by said shaft, said ring being at least partially immersed in said sump fluid to carry said fluid for said machine parts during rotation, and
   b. first and second abutments attached to said shaft, one on each side of said ring and spaced from said ring sufficiently to form an axial gap for a fluid film which transmits rotational power from said abutments to said ring.

2. A lubrication system as in claim 1 further including means for varying said gap between said abutments and said ring to compensate for a change in rotational power transmitted to said ring with change in viscosity of said fluid with temperature.

3. A lubrication system as in claim 2 wherein said gap varying means comprises:
   a. means connecting said first and second abutments, said connecting means formed of a first metal having a first thermal coefficient of expansion, and
   b. said ring formed of a second metal having a second thermal coefficient of expansion whereby said abutments expand at a rate different than said ring thereby generating a predetermined rate of closure of said gap between said abutments and said ring to vary the fluid drag as fluid viscosity changes with temperature.

4. A lubrication system as in claim 3 further including means for decreasing said rate of gap closure as said temperature reaches a predetermined value thereby tending to hold said transmitted power constant.

5. A lubrication system as in claim 4 wherein said means for decreasing the rate of gap closure comprises:
   a. means interposed between said first and second abutments and said shaft, said interposed means being attached to said shaft for rotation and being formed of a third metal having a third thermal coefficient of expansion greater than said means connecting said abutments, and
   b. means coupling said interposed means to said first and second abutments such that at said predetermined temperature value said interposed means has expanded sufficiently to contact said first and second abutments and increase the rate of expansion between said first and second abutments thereby decreasing the rate of said gap closure with increasing temperature.

6. A lubrication system as in claim 5 wherein said means connecting said first and second abutments together comprises a corrugated panel integrally formed with said first and second abutments at the base thereof whereby outward expansion of said first and second abutments caused by said interposed means expands said corrugated panel.

7. A lubrication system as in claim 6 wherein said means coupling said interposed means to said first and second abutments comprises a tongue and groove formed in mating arrangement between said first and second abutments and said interposed means such that a space exists between said tongue and said groove whereby said interposed means expands freely in an axial direction until said predetermined temperature is reached at which time contact is made between said tongue and groove thereby increasing the rate of expansion between said first and second abutments and decreasing the rate of said gap closure with increasing temperature.

8. A lubrication system for moveable machine parts within a housing having a sump containing a fluid and a rotatable shaft comprising:
   a. a ring of substantially rectangular cross-section eccentrically encircling and being frictionally rotated by said shaft, said ring being at least partially immersed in said sump fluid to carry said fluid during rotation for said machine parts,
   b. a plurality of fluid carrying fins radially attached to said ring to increase the fluid carrying capacity of said ring, said fins commencing from each outer edge and extending partially inwardly in a transverse direction along the ring width towards each other thereby forming an annular space between said fins and said ring,
   c. conduit means having an inlet located within said annular space for receiving fluid carried in said annular space and delivering said fluid to said moveable machine parts, and
   d. first and second abutments attached to said shaft, one on each side of said ring and spaced from said ring sufficiently to form an axial gap for a fluid film which transmits rotational power from said abutments to said ring.

9. A lubrication system as in claim 8 further including means for varying said gap between said abutments and said ring to compensate for a change in rotational power transmitted to said ring with change in viscosity of said fluid with temperature.

10. A lubrication system as in claim 9 wherein said gap varying means comprises:
    a. means connecting said first and second abutments said connecting means formed of a first metal having a first thermal coefficient of expansion, and
    b. said ring formed of a second metal having a second thermal coefficient of expansion different from said first metal whereby said abutments expand at a rate different than said ring thereby generating a predetermined rate of closure of said gap between said abutments and said ring to vary the fluid drag as fluid viscosity changes with temperature.

11. A lubrication system as in claim 10 further including means for decreasing said rate of gap closure as said temperature reaches a predetermined value thereby tending to hold said transmitted power constant.

12. A lubrication system as in claim 11 wherein said means for decreasing the rate of gap closure comprises:
    a. means interposed between said first and second abutments and said shaft, said interposed means being attached to said shaft for rotation and being formed of a third metal having a third thermal coefficient of expansion greater than said means connecting said abutments, and
    b. means coupling said interposed means to said first and second abutments such that at said predetermined temperature value said interposed means has expanded sufficiently to contact said first and second abutments and increase the rate of expansion between said first and second abutments thereby decreasing the rate of said gap closure with increasing temperature.

13. A lubrication system as in claim 12 wherein said means connecting said first and second abutments together comprises a corrugated panel integrally formed with said first and second abutments at the base thereof whereby outward expansion of said first and second abutments caused by said interposed means expands said corrugated panel.

14. A lubrication system as in claim 13 wherein said means coupling said interposed means to said first and second abutments comprises a tongue and groove formed in mating arrangement between said first and second abutments and said interposed means such that a space exists between said tongue and said groove whereby said interposed means expands freely in an axial direction until said predetermined temperature is reached at which time contact is made between said tongue and groove thereby increasing the rate of expansion between said first and second abutments and decreasing the rate of said gap closure with increasing temperature.

15. A lubrication system for moveable machine parts within a housing having a sump containing a fluid and a rotatable shaft comprising:
  a. a ring eccentrically encircling and being frictionally rotated by said shaft, said ring being a channel having a base and side legs vertically extending from said base to form a channel U-shaped in cross-section with the open end of said U facing said shaft and being at least partially immersed in said sump fluid to carry said fluid during rotation,
  b. conduit means having an inlet located within said U-shaped channel and adjacent said shaft for receiving fluid carried by said channel and delivering said fluid to said moveable machine parts, and
  c. first and second abutments attached to said shaft, one on each side of said ring, and spaced from said ring sufficiently to form an axial gap for a fluid film which transmits rotational power from said abutments to said ring.

16. A lubrication system as in claim 15 further including means for varying said gap between said abutments and said ring to compensate for a change in rotational power transmitted to said ring with change in viscosity of said fluid with temperature.

17. A lubrication system as in claim 16 wherein said gap varying means comprises:
  a. means connecting said first and second abutments, said connecting means formed of a first metal having a first thermal coefficient of expansion, and
  b. said ring formed of a second metal having a second thermal coefficient of expansion different from said first metal whereby said abutments expand at a rate different than said ring thereby generating a predetermined rate of closure of said gap between said abutments and said ring to vary the fluid drag as fluid viscosity changes with temperature.

18. A lubrication system as in claim 17 further including means for decreasing said rate of gap closure as said temperature reaches a predetermined value thereby tending to hold said transmitted power constant.

19. A lubrication system as in claim 18 wherein said means for decreasing the rate of gap closure comprises:
  a. means interposed between said first and second abutments and said shaft, said interposed means being attached to said shaft for rotation and being formed of a third metal having a third thermal coefficient of expansion greater than said means connecting said abutments, and
  b. means coupling said interposed means to said first and second abutments such that at said predetermined temperature value said interposed means has expanded sufficiently to contact said first and second abutments and increase the rate of expansion between said first and second abutments thereby decreasing the rate of said gap closure with increasing temperature.

20. A lubrication system as in claim 19 wherein said means connecting said first and second abutments together comprises a corrugated panel integrally formed with said first and second abutments at the base thereof whereby outward expansion of said first and second abutments caused by said interposed means expand said corrugated panel.

21. A lubrication system as in claim 20 wherein said means coupling said interposed means to said first and second abutments comprises a tongue and groove formed in mating arrangement between said first and second abutments and said interposed means such that a space exists between said tongue and said groove whereby said interposed means expands freely in an axial direction until said predetermined temperature is reached at which time contact is made between said tongue and groove thereby increasing the rate of the expansion between said first and second abutments and decreasing the rate of said gap closure with increasing temperature.

22. A lubrication system as in claim 15 further including:
  a. a plurality of fluid carrying fins axially attached to the base of said U to increase the fluid carrying capacity of said ring, said fins commencing from the inside of each leg and extending partially inwardly in a transverse direction toward the center of said U thereby forming an annular space between said fins, and
  b. means for locating said conduit means in said annular space for receiving fluid carried in said annular space.

23. A lubrication system as in claim 22 further including first and second abutments attached to said shaft, one on each side of said ring and spaced from said ring sufficiently to form an axial gap for a fluid film which transmits rotational power from said abutments to said ring.

24. A lubrication system as in claim 23 further including means for varying said gap between said abutments and said ring to compensate for a change in rotational power transmitted to said ring with change in viscosity of said fluid with temperature.

25. A lubrication system as in claim 24 wherein said gap varying means comprises:
  a. means connecting said first and second abutments, said connecting means formed of a first metal having a first thermal coefficient of expansion, and
  b. said ring formed of a second metal having a second thermal coefficient of expansion different from said first metal whereby said abutments expand at a rate different than said ring thereby generating a predetermined rate of closure of said gap between said abutments and said ring to vary the fluid drag as fluid viscosity changes with temperature.

26. A lubrication system as in claim 25 further including means for decreasing said rate of gap closure as said temperature reaches a predetermined value thereby tending to hold said transmitted power constant.

27. A lubrication system as in claim 26 wherein said means for decreasing the rate of gap closure comprises:
   a. means interposed between said first and second abutments and said shaft, said interposed means being attached to said shaft for rotation and being formed of a third metal having a third thermal coefficient of expansion greater than said means connecting said abutments, and
   b. means coupling said interposed means to said first and second abutments such that at said predetermined temperature value said interposed means has expanded sufficiently to contact said first and second abutments and increase the rate of expansion between said first and second abutments thereby decreasing the rate of said gap closure with increasing temperature.

28. A lubrication system as in claim 27 wherein said means connecting said first and second abutments together comprises a corrugated panel integrally formed with said first and second abutments at the base thereof whereby outward expansion of said first and second abutments caused by said interposed means expands said corrugated panel.

29. A lubrication system as in claim 28 wherein said means coupling said interposed means to said first and second abutments comprises a tongue and groove formed in mating arrangement between said first and second abutments and said interposed means, such that a space exists between said tongue and said groove whereby said interposed means expands freely in an axial direction until said predetermined temperature is reached at which time contact is made between said tongue and groove thereby increasing the rate of expansion between said first and second abutments and decreasing the rate of said gap closure with increasing temperature.

30. A lubrication system as in claim 24 further comprising a lip perpendicularly attached to the outer end of each leg of said U-shaped channel and extending partially inwardly toward the center of said U-shaped channel to form both a base for said fins and a C-shaped ring whereby said fins are enclosed on three sides.

31. A lubrication system as in claim 30 further including:
   a. first and second abutments attached to said shaft, one on each side of said ring and spaced from said ring sufficiently to form an axial gap for a fluid film which transmits rotational power from said abutments to said ring, and
   b. means for varying said gap between said abutments and said ring to compensate for change in rotational power transmitted to said ring with change in viscosity of said fluid with temperature.

32. A lubrication system as in claim 31 wherein said gap varying means comprises:
   a. means connecting said first and second abutments, said connecting means formed of a first metal having a first thermal coefficient of expansion, and
   b. said ring formed of a second metal having a second thermal coefficient of expansion different from said first metal whereby said abutments expand at a rate different than said ring thereby generating a predetermined rate of closure of said gap between said abutments and said ring to vary the fluid drag as fluid viscosity changes with temperature.

33. A lubrication system as in claim 32 further including means for decreasing said rate of gap closure as said temperature reaches a predetermined value thereby tending to hold said transmitted power constant.

34. A lubrication system as in claim 33 wherein said means for decreasing the rate of gap closure comprises:
   a. means interposed between said first and second abutments and said shaft, said interposed means being attached to said shaft for rotation and being formed of a third metal having a third thermal coefficient of expansion greater than said means connecting said abutments, and
   b. means coupling said interposed means to said first and second abutments such that at said predetermined temperature value said interposed means has expanded sufficiently to contact said first and second abutments and increase the rate of expansion between said first and second abutments thereby decreasing the rate of said gap closure with increasing temperature.

35. A lubrication system as in claim 34 wherein said means connecting said first and second abutments together comprises a corrugated panel integrally formed with said first and second abutments at the base thereof whereby outward expansion of said first and second abutments caused by said interposed means expands said corrugated panel.

36. A lubrication system as in claim 35 wherein said means coupling said interposed means to said first and second abutments comprises a tongue and groove formed in mating arrangement between said first and second abutments and said interposed means, such that a gap exists between said tongue and said groove whereby said interposed means expands freely in an axial direction until said predetermined temperature is reached at which time contact is made between said tongue and groove thereby increasing the rate of expansion between said first and second abutments and decreasing the rate of said gap closure with increasing temperature.

37. A lubrication system for moveable machine parts within a housing having a sump containing a liquid and a rotatable shaft comprising:
   a. a ring eccentrically encircling and being frictionally rotated by said shaft, said ring being a channel having a base, side walls vertically extending from said base, and a lip perpendicularly attached to the outer end of each side wall and extending partially inwardly toward each other to form a channel C-shaped in cross-section with the open end of said C facing said shaft, said ring being at least partially immersed in said sump liquid to carry said liquid during rotation,
   b. conduit means having an inlet located within said C-shaped channel and adjacent said shaft for receiving liquid carried by said channel and delivering said liquid to said moveable machine parts, and
   c. first and second abutments attached to said shaft, one on each side of said ring, and spaced from said ring sufficiently to form an axial gap for a liquid film which transmits rotational power from said abutments to said ring.

38. A lubrication system as in claim 37 further including means for varying said gap between said abutments and said ring to compensate for a change in rotational power transmitted to said ring with change in viscosity of said fluid with temperature.

39. A lubrication system as in claim 38 wherein said spacing varying means comprises:
   a. means connecting said first and second abutments, said connecting means formed of a first metal having a first thermal coefficient of expansion, and
   b. said ring formed of a second metal having a second thermal coefficient of expansion different from said first metal whereby said abutments expand at a rate different than said ring thereby generating a predetermined rate of closure of said gap between said abutments and said ring to vary the fluid drag as fluid viscosity changes with temperature.

40. A lubrication system as in claim 39 further including means for decreasing said rate of gap closure as said temperature reaches a predetermined value thereby tending to hold said transmitted power constant.

41. A lubrication system as in claim 40 wherein said means for decreasing the rate of gap closure comprises:
   a. means interposed between said first and second abutments and said shaft, said interposed means being attached to said shaft for rotation and being formed of a third metal having a third thermal coefficient of expansion greater than said means connecting said abutments, and
   b. means coupling said interposed means to said first and second abutments such that at said predetermined temperature value said interposed means has expanded sufficiently to contact said first and second abutments and increase the rate of expansion between said first and second abutments thereby decreasing the rate of said gap closure with increasing temperature.

42. A lubrication system as in claim 41 wherein said means connecting said first and second abutments together comprises a corrugated panel integrally formed with said first and second abutments at the base thereof whereby outward expansion of said first and second abutments caused by said interposed means expands said corrugated panel.

43. A lubrication system as in claim 42 wherein said means coupling said interposed means to said first and second abutments comprises a tongue and groove formed in mating arrangement between said first and second abutments and said interposed means for positioning said tongue in said groove such that a space exists between said tongue and said groove whereby said interposed means expands freely in an axial direction until said predetermined temperature is reached at which time contact is made between said tongue and groove thereby increasing the rate of expansion between said first and second abutments and decreasing the rate of said gap closure with increasing temperature.

* * * * *